United States Patent
Lippett et al.

(10) Patent No.: US 6,667,993 B1
(45) Date of Patent: Dec. 23, 2003

(54) COMMUNICATION CHANNEL

(75) Inventors: Mark Lippett, Wallingford (GB);
Marco Collivignarelli, Place Gabriel Peri Cagnes-sur-Mer (FR); Steve Colquhoun, Tournefeuille (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/368,055

(22) Filed: Aug. 3, 1999

(30) Foreign Application Priority Data

Oct. 22, 1998 (EP) .............................. 98402633

(51) Int. Cl.[7] .................................. H04J 3/06
(52) U.S. Cl. ..................... 370/509; 370/514; 375/365
(58) Field of Search ................. 370/503, 505, 370/506, 507, 508, 509, 510, 512, 516, 513, 514, 519, 520; 375/260, 363, 364, 365, 366, 374

(56) References Cited

U.S. PATENT DOCUMENTS 5,341,405 A    8/1994   Mallard, Jr.
5,408,473 A    4/1995   Hutchison et al.
5,425,020 A    6/1995   Gregg et al.

FOREIGN PATENT DOCUMENTS

| EP | 0 213 641 A2 | 3/1987 |
| EP | 0 533 091 A2 | 3/1993 |
| WO | WO 98/20655 | 5/1998 |

*Primary Examiner*—Alpus H. Hsu
*Assistant Examiner*—Thien D Tran
(74) *Attorney, Agent, or Firm*—Gerald E. Laws; W. James Brady, III; Frederick J. Telecky, Jr.

(57) ABSTRACT

A digital system (100) has two or more nodes (120, 130) and a communication channel (110, 111) for transferring a single stream of ordered data from one node to another. The communication channel (110) has a number of data links (110a–110g) for transferring a plurality of sub-streams of data in a parallel fashion in order to transfer more data than a single data link is capable of transferring. Receivers (132a–132g) each have synchronizing circuitry (200, 202) for synchronizing a byte clock and a frame pulse of each received data sub-stream to the byte clock and frame pulse of a preselected master one of the receivers such that inherent data skew is eliminated.

11 Claims, 9 Drawing Sheets

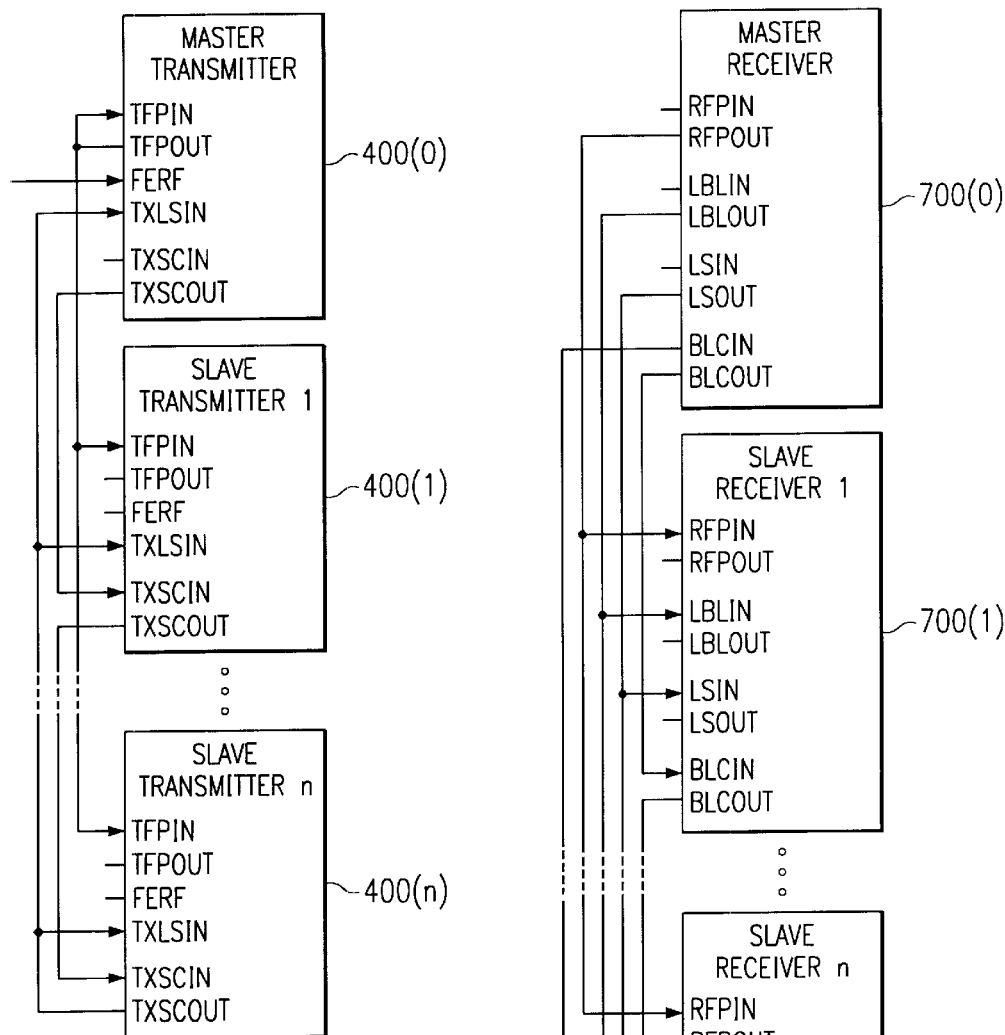
FIG. 5
FIG. 8
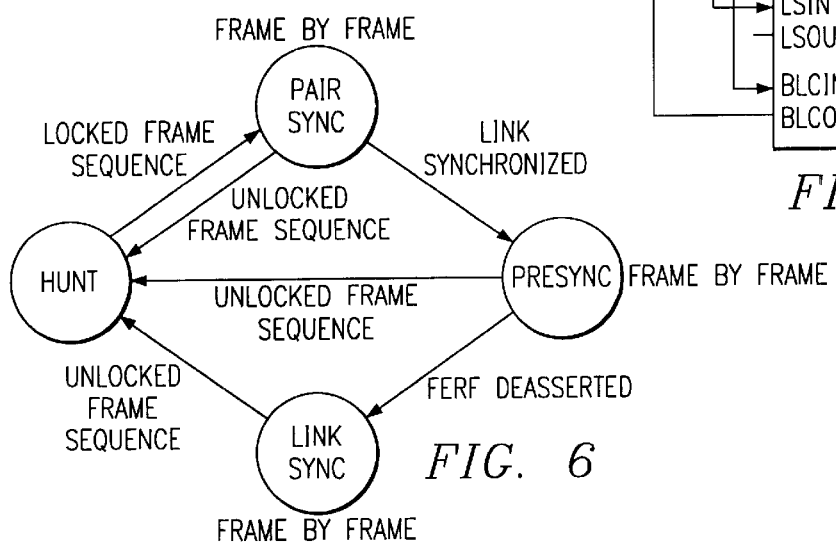
FIG. 6

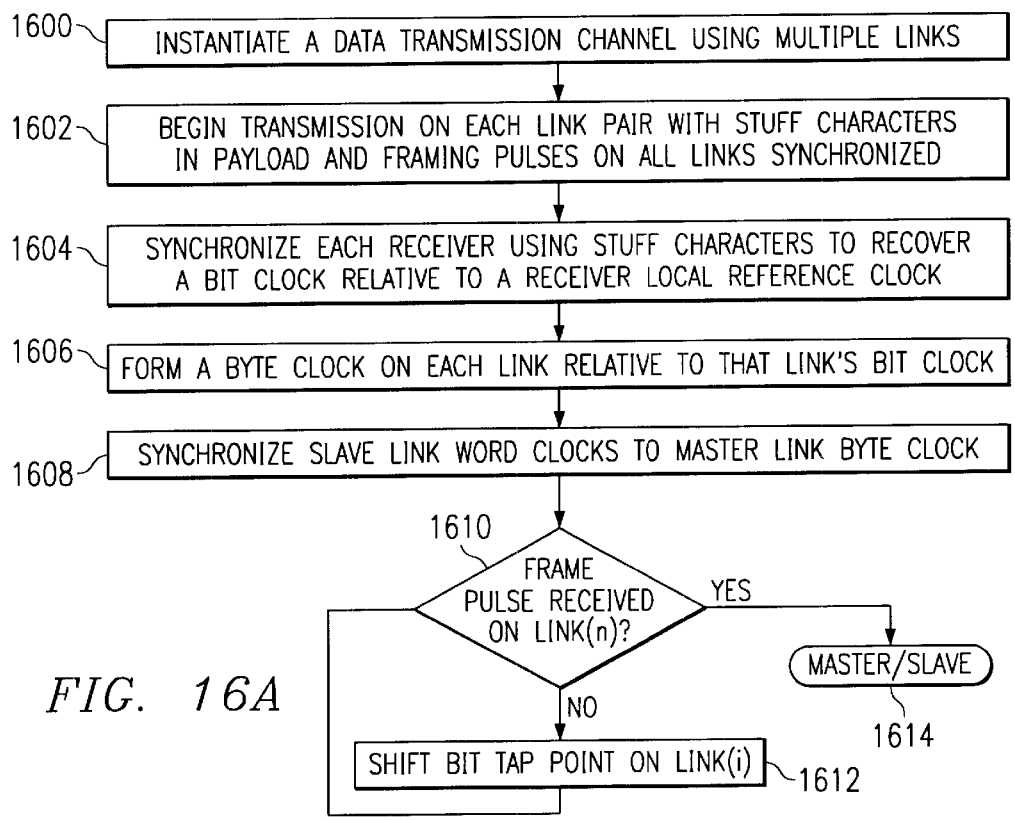
FIG. 16A
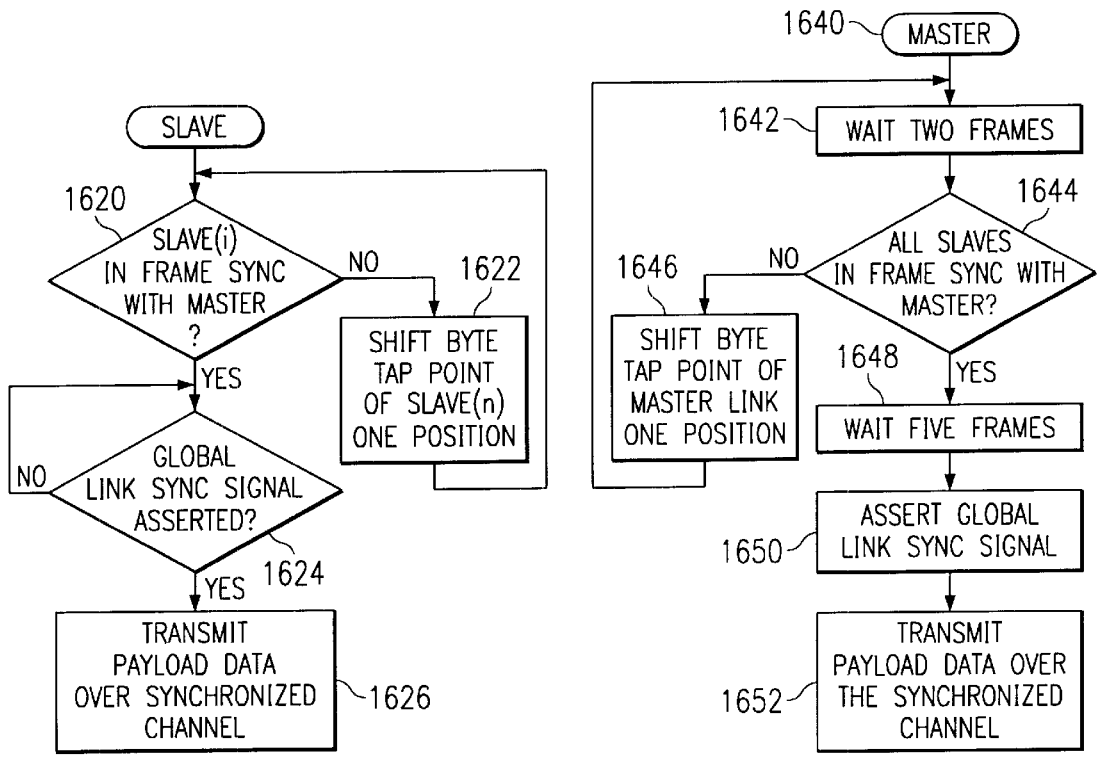
FIG. 16B
FIG. 16C

COMMUNICATION CHANNEL

This application claims priority to S.N. 98402633.6, filed in Europe on Oct. 22, 1998.

TECHNICAL FIELD OF THE INVENTION

This invention relates to transferring large amounts of data between various nodes of a digital system, and more particularly to providing a communication channel that can have a plurality of synchronized data links provide a higher bandwidth than can be provided by a single data link.

BACKGROUND OF THE INVENTION

Within a digital system, streams of data are often transferred from one node in the system to another. This is often done in a word parallel manner using a multi-bit bus, such as a 64 bit data bus or a 32 bit address bus. When a digital system is implemented on different printed circuit (PC) cards, a backplane which has one or more buses is used to interconnect the PC cards. In each case, each word transfer is done in manner so that all of the bits of the word on the parallel signal lines of the data bus remain synchronized with a designated timing signal.

A digital system may have two or more nodes which are separated by a distance that makes interconnection via a backplane impractical. In this case, data streams are transferred over a communication channel that may be a conductive cable, an optical link, an infared link, or a radio link, for example. Generally, the data stream is transferred in a serial manner over the communication channel so that only a single link is required. Cables may provide multiple signal lines so that the data stream can be transferred in a parallel manner, but the transfer rate is controlled so that all of the bits of the word on the parallel signal lines of the cable remain synchronized with a designated timing signal.

Any physical media for transferring data inherently causes a delay in the transfer of the data. When parallel data links are employed, each data link may have a slightly different delay characteristic due to physical differences. Thus, a skew is introduced between data transferred on the different links. Induced skew limits the transfer rate at which data can be transferred in a parallel manner on a communication channel.

SUMMARY OF THE INVENTION

An illustrative embodiment of the present invention seeks to provide a method for transferring a single stream of data on a plurality of data links that avoids or minimizes above-mentioned problems.

Aspects of the invention are specified in the claims. In carrying out principles of the present invention, a method provides for transferring a single stream of ordered data over a plurality of data links each having a transmitter and a receiver, wherein the single stream of data comprises a plurality of words each having a plurality of bits. The method divides the single stream of data into a plurality of sub-streams of data and inserts a frame pulse periodically in each sub-stream of data. Each sub-stream of data is then transmitted over a corresponding data link of the plurality of data links in a parallel manner to form a plurality of received data sub-streams, wherein a first data link has a first delay time that may be different from a second delay time of a second data link, such that a data skew occurs between a first received data sub-stream and a second received data sub-stream. After reception, a byte clock is recovered from each received data sub-stream and the byte clock and frame pulse of each slave received data sub-stream is synchronized to the byte clock and frame pulse of the master received data sub-stream such that the data skew is eliminated. Then, the plurality of received data sub-streams are combined to form a single received stream of ordered data.

According to another feature of the invention the byte clock of each data slave link if forced to align approximately with the byte clock of the master data link, and a bit tap point on each received data sub-stream is shifted so that byte boundaries of each received data sub-stream align with the byte clock associated with each received data sub-stream.

According to another feature of the invention, frame synchronization is tested for by determining if the frame pulse of each of the slave received data sub-streams is synchronized with the frame pulse of the master received data sub-stream. If frame synchronization is not present, then a byte tap point in each of the slave received data sub-streams is shifted up to a first number of times until each slave received data sub-stream is frame synchronized with the master received data sub-stream.

According to another feature of the invention, a byte tap point in the master received data sub-stream is shifted by one position if global frame synchronization is not achieved, and then the slave tap points are again shifted until each slave received data sub-stream is frame synchronized with the master received data sub-stream.

BRIEF DESCRIPTION OF THE DRAWINGS

For a better understanding of the present invention, reference will now be made, by way of example, to the accompanying drawings, in which:

FIG. 5 is a schematic illustrating interconnections of the plurality of data link transmitters of FIG. 2;

FIG. 6 is a state diagram illustrating the operation of the data link transmitter of FIG. 4;

FIG. 8 is a schematic illustrating interconnections of the plurality of data link receivers of FIG. 2;

FIG. 16A is a flow chart illustrating the process of byte aligning the plurality of data links of FIG. 2;

FIG. 16B is a flow chart illustrating the process of frame synchronization used in each slave link of FIG. 2; and FIG. 16C is a flow chart illustrating the process of frame synchronization used in the master link of FIG. 2.

Corresponding numerals and symbols in the different figures and tables refer to corresponding parts unless otherwise indicated.

DETAILED DESCRIPTION OF THE INVENTION

Aspects of the present invention include methods and apparatus for transferring a single stream of ordered data over a communication channel having a plurality of parallel data links which each may have varying amounts of inherent delay. In the following description, specific information is set forth to provide a thorough understanding of the present invention. Well known circuits and devices are included in block diagram form in order not to complicate the description unnecessarily. Moreover, it will be apparent to one skilled in the art that specific details of these blocks are not required in order to practice the present invention.

Figure 1:
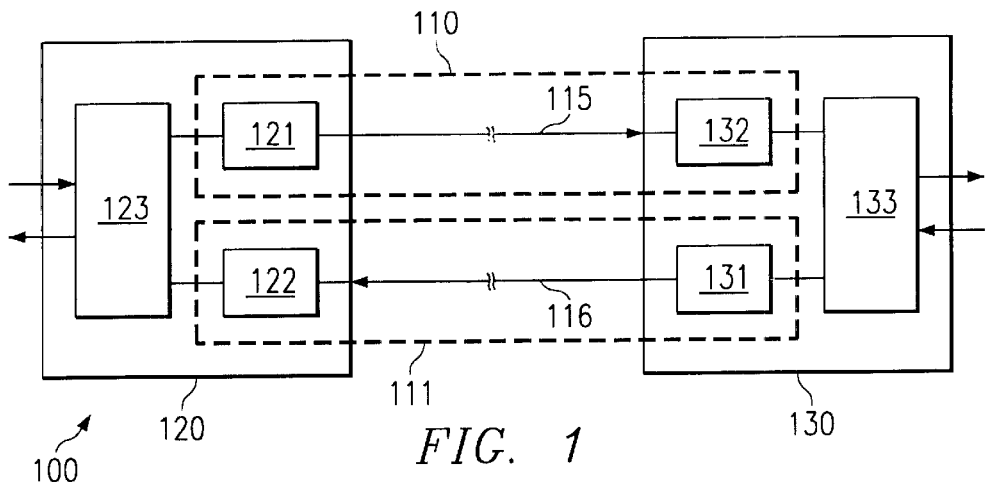
FIG. 1 is a block diagram of a portion of a digital system illustrating a communication channel for transferring data between two nodes of the system, according to aspects of the present invention.

FIG. 1 is a block diagram of a portion of a digital system 100 illustrating a communication channel 110 for transferring data between two nodes (120, 130) of the system, according to aspects of the present invention. A reverse channel 111 is provided for transferring data in the opposite direction to channel 110, and uses a separate physical media. Another embodiment may multiplex bi-directional data on the same physical media.

Node 120 has transmitting circuitry 121, receiving circuitry 122, and processing circuitry 123. Processing circuitry 123 may include a digital signal processor, memory circuits, analog or linear circuits, or any of a wide range of known or novel circuits. Similarly, node 130 has transmitting circuitry 131, receiving circuitry 132, and processing circuitry 133. Physical media 115 connects transmitter 121 to receiver 132, and is twisted pairs of wire in this embodiment. Likewise, physical media 116 connects transmitter 131 to receiver 122.

Due to a need to transfer a large amount of data across communication channel 110, a plurality of data links are included within channel 110.

Figure 2:
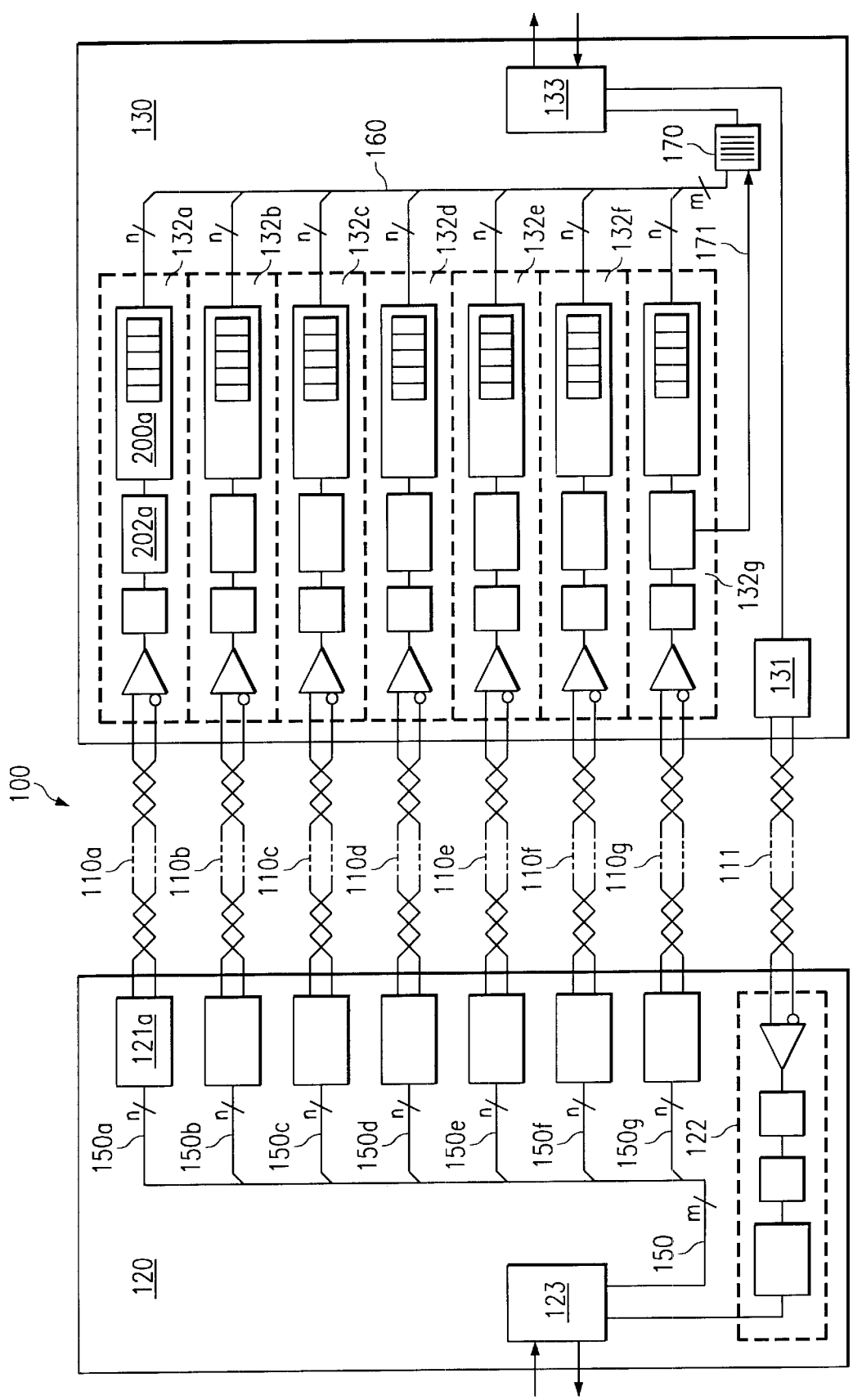
FIG. 2 is a block diagram showing more detail of the plurality of data links which interconnect the two nodes of FIG. 1.

FIG. 2 is a block diagram showing more detail of the plurality of data links which interconnect the two nodes of FIG. 1. Seven data links 110a–110g are illustrated, but communication channels with a greater number or a fewer number of data links can be embodied, according to aspects of the present invention. Circuitry 150a–g divides a single stream of ordered word data on bus 150 into a plurality of sub-streams of ordered byte data. Data bus 150 is m bits wide for m-bit words, while each of buses 150a–150g are n bits wide and bytes are n-bits. However, in another embodiment, 150a–150g could be different widths.

Data links 110a–110g transmit each data sub-stream serially, but all the data links transmit in a parallel manner so that all of the data sub-streams are received approximately coincidentally. However, each data link 110a–110g has an inherent transfer delay time, and the transfer delay time of one link is typically different from the transfer delay time of another link due to physical differences in the data links. Therefore, a skew is induced between the various received data sub-streams at receivers 132a–132g. According to aspects of the present invention, receivers 132a–132g compensate for the skew between data links so that circuitry 160 can combine the plurality of received data streams to form a single received data stream of ordered data which is m bits wide. This single stream of data can be buffered in a single FIFO 170 in response to a common word clock 171 before being sent to processing circuitry 133.

According to an aspect of the present invention, one of the links is designated as a master link, and all of the other links are designated as slave links. During operation, the slave links are synchronized to the master link by synchronizing circuitry 200 and 202 in each receiver.

Figure 3:
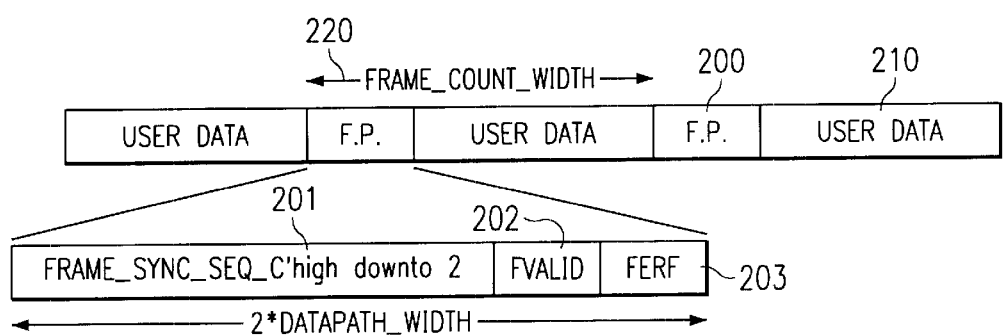
FIG. 3 is an illustration of a typical frame of data which is transferred on the communication channel of FIG. 1.

FIG. 3 is an illustration of a typical frame of data which is transferred on each data link of communication channel 110 or 111 of FIG. 1. Each frame includes a frame pulse portion 200 and a data portion 210. The length of the frame is defined by a frame_count_width 220, and is typically 1024 bytes. Each byte comprises a number of bits, which is defined by a datapath_width variable. For a given embodiment of digital system 100, the number of data links 110a–110g, the frame_count_variable and the datapath_width are selected when digital system 100 is designed; however, other embodiments may vary, as will be discussed later with reference to Table 15.

The framing pulse and pattern formats are given in Table 1. The framing pulse occupies two bytes, and the least significant two bits are masked and used to transfer status information. Framing pulse 200 includes FRAME_SYNC_SEQ 201, status bits FVALID 202 and FERF 203. During synchronization of channel 110/111, stuff characters are inserted in data portion 210 in order to provide sufficient edge density to allow a clock recovery circuit to achieve lock. The stuff characters shown in Table 1 are selected to provide maximum hamming distance between the framing pulses and the stuff characters to eliminate the possibility of false framing. Each stuff character shown in Table 1 is zero filled to occupy two byte positions.

TABLE 1

Framing Pulse Format

| DATAPATH_WIDTH | Stuff Characters (hex.) | Pattern (FRAME_SYNC_SEQ_C) |
|---|---|---|
| 4 | 17 | 4B |
| 5 | 1F | 2D8 |
| 6 | 6F | B62 |
| 7 | BF | 2D8A |
| 8 | 63F | F628 |
| 9 | 8FF | 3D8B0 |
| 10 | 22FF | F62E0 |

Two status bits are defined. FVALID 202 indicates that the current frame contains user data. FERF 203 (far end receiver failure) conveys the status of the local receiver's OOF (out of frame indicator) to the downstream transmitter for use in enabling data transfer.

For example, during synchronization, receiver 132's OOF is active and transmitter 121 is outputting the stuff pattern in the payload. Receiver 132's OOF is transmitted to receiver 122 via bit 0 (FERF) of the header pattern in link 111. This is decoded in receiver 122 and included in the logic which decodes link synchronization in transmitter 121. Hence link 110 does not start transferring valid data until all elements are ready.

Figure 4:
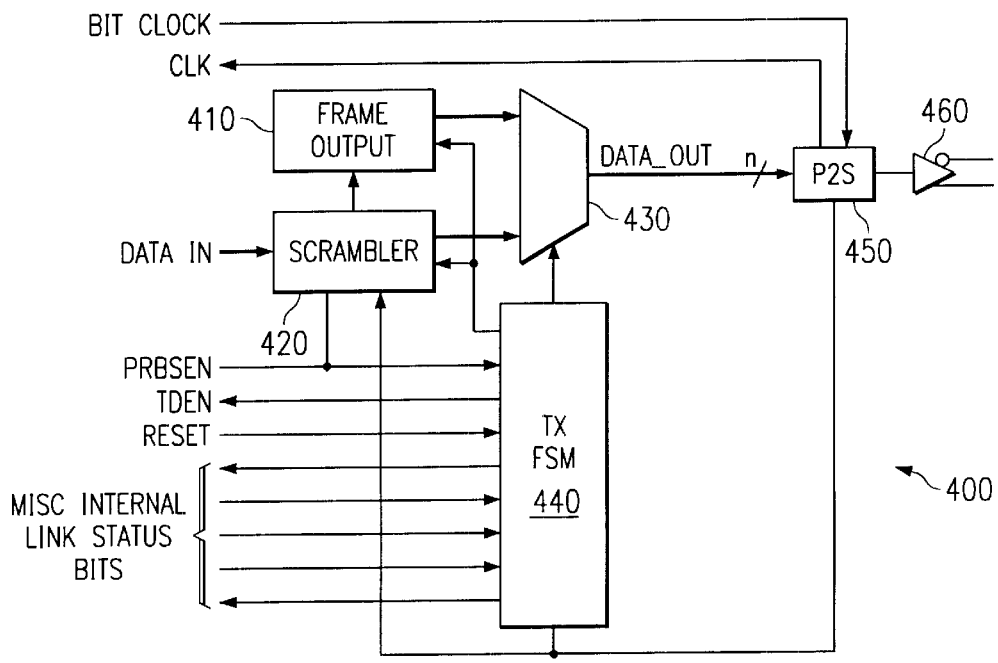
FIG. 4 is a more detailed block diagram of a data link transmitter of FIG. 2.

FIG. 4 is a more detailed block diagram of a data link transmitter 400, which is the same as transmitters 121a–121g of FIG. 2. FIG. 5 is a schematic illustrating interconnections of a plurality of data link transmitters 400(i). For multiple data links, each link transmits framing pulses simultaneously. The transmitters are synchronized using a master transmit strobe. The functional blocks are described below.

Table 2 describes various signals which are connected to transmitter 400 as shown on FIG. 4 and/or FIG. 5. All signals are active high unless explicitly stated otherwise.

Throughout this document the VHDL attribute syntax has been used to represent bus widths. For example BUS'high represents the integer index of the highest bit in the bus BUS'LOW represents the integer index of the lowest bit in the bus. BUS'range represents the range of bits. The keyword 'downto' is used to represent all bits between two indexes.

For example, an eight bit bus DATA[7:0]:

DATA'high=7

DATA'low=0

DATA'range=7 downto 0

During the HUNT, PREBYTESYNC and PRESYNC states (described with reference to FIG. 6) a fixed sequence is output in the frame payload which does not contain false framing patterns (see Table 1). At all other times multiplexer 430 forwards inputs from scrambler 420. All signals are active high unless explicitly stated otherwise.

TABLE 3

Multiplexer Interface Description

| PORTS | TYPE | DESCRIPTION |
|---|---|---|
| reset | input | synchronous reset |
| clock | input | internal clock |
| frame_sync_gate | input | Control signal used to define the period during which a framing pulse occurs. |
| nerf | input | Near end receiver failure |
| prbs_en | input | Scrambler enable |
| data_out | Output | ((DATAPATH'high-1) downto 0) data bus sent to receiver |
| prbs_data_out | input | ((DATAPATH'high-1) downto 0) data bus from scrambler |

It is desirable to provide scrambling on the data to reduce EMC and provide sufficient edge density to ensure a low

TABLE 2

Transmitter Interface Description

| Pin Name | Internal/ External | Input/ Output | Description |
|---|---|---|---|
| RESET | External | Input | Reset signal for framer and scrambler. Reset causes the scrambler to be preloaded with all 1's |
| CLOCK | External | Output | Byte clocks. These are identical clocks derived from the transmit bit clock. |
| TMODE | External | Input | Places the transmitter into test mode. |
| PRBSEN | External | Input | This signal may be used to enable/disable the scrambler |
| NERF | External | Input | Status signal indicating the status of the receiver on this channel at this end of the link. |
| FERF | External | Input | Status signal indicating the status of the receiver on this channel at the far end of the link. |
| TFPIN | Internal | Input | This signal is used by slave transmitters to align their frame pulse transmit sequences with the master |
| TFPOUT | Internal | Output | This signal is output by the master during frame sequence insertion. It should be left unconnected on slave instances. |
| TXLSIN | Internal | Input | Transmit link status in. This signal is used to move all the link transmit state machines into the SYNC state. |
| TXSCIN | Internal | Input | Transmit status chain in. This is a daisy-chained signal which is used to confer individual transmit status signals back to the master. |
| TXSCOUT | Internal | Output | See above. |
| DATA_IN | External | Input | ((DATA PATH'high-1) downto 0) Data input valid when TDEN is TRUE. |
| TDEN | External | Output | This output defines the period when data may be read by the transmitter and is designed to be interfaced directly to a FIFO. |
| DATA_OUT | Internal | Output | ((DATAPATH'high-1) downto 0) Data output valid on rising edge of clockk. Connect directly to P2S. |

Table 3 describes signals used by Frame Output circuitry 410 and Multiplexer 430. In response to a timing signal from the TX FSM the frame output circuitry 410 outputs framing bytes to the transmit multiplexer 430. Multiplexer 430 then sends the n-bit wide data sub-stream to the parallel to serial (P2S) converter 450. P2S 450 sends the serialized data sub-stream to physical media interface 460. The output of interface 460 is determined by the type of physical media 115 used in the communication channel.

FIG. 5 shows an implementation which fully synchronizes the bidirectional link 110/111 before transmitting data. The FERF signal that is conveyed on the master link is the only one used in synchronization. The other FERF inputs may be used to transfer proprietary in-band data.

cost local oscillator may be used to generate the reference clock in an embodiment which uses a clock recovery device. Table 4 describes signals used by scrambler 420. All signals are active high unless explicitly stated otherwise.

TABLE 4

Scrambler/Descrambler Interface Description

| PORTS | TYPE | DESCRIPTION |
|---|---|---|
| reset | input | synchronous reset |
| clock | input | internal clock |
| tmode | input | Test mode input |
| frame_sync_gate | input | Used to reset the MFSR |

TABLE 4-continued

Scrambler/Descrambler Interface Description

| PORTS | TYPE | DESCRIPTION |
|---|---|---|
| prbs_ena | input | Scrambling enable |
| data_in | input bus | ((DATAPATH'high-1) downto 0) Input data |
| data_out | output bus | ((DATAPATH'high-1) downto 0) Output data (scrambled or descrambled) |

Scrambler 420 randomizes the data using a maximal length shift register (MLSR) with tap points selected to provide pseudo random behavior. The generator polynomial may be set to one of the values listed in Table 5. Alternatively, other scrambling polynomials may be used.

Different scrambling polynomials may be selected according to perceived correlation of the periodicity of the scrambler and the framing pattern. The scrambler may be selected according to the application and may be frame or self synchronizing.

Correlation and Periodicity

A pseudo-random sequence generated by an n-bit maximal length shift register is a binary sequence of period $r=2^n-1$. The output will have a period equal to the least common multiple, LCM, of p (the input period) and r. The LCM is enlarged by selecting a prime number for r.

$X^7+X^6+1$: This scrambler is defined in ITU-T Rec. G.709 for its performance in clock synchronization.

$X^{31}+X^{28}+1$: This is the scrambler defined in the ITU-T Rec. I.432 (or in the ETSI ETS 300 299) for the cell based physical layer. It is a distributed sample scrambler having the pseudo random sequence polynomial $X^{31}+X^{28}+1$.

TABLE 5

Scrambler/Descrambler Generator Polynomial

| Polynomial | Reference |
|---|---|
| $X^{31} + X^{28} + 1$ | X31_X28_1 |
| $X^7 + X^6 + 1$ | X7_X6_1 |
| $X^{43} + 1$ | k_X43_1 |
| $X^{17} + X^{14} + 1$ | k_X17_X14_1 |

During the framing sequence frame synchronous scrambler 420 is reset to all 1's. Scrambler 402 may be disabled permanently via the top level interface. When in test mode scrambler 420 ignores the data and outputs the scrambler code, descrambler 720 (see FIG. 7) behaves normally.

Transmit FSM (Finite State Machine) 440 outputs codes to enable the frame sequence. It also accepts a master framing pulse input to which output frame sequence timing is locked. The transmitter waits for removal of FERF before enabling normal operation of TXEN. In test mode input data is ignored and the frame period is set to 16 bytes. Signals used with Transmitter Finite State Machine 440 are described. in Table 6. All signals are active high unless explicitly stated otherwise.

TABLE 6

Transmit Finite State Machine Interface Description

| PORTS | TYPE | DESCRIPTION |
|---|---|---|
| reset | input | synchronous reset |
| clock | input | internal clock |
| tmode | input | Test mode input. |
| frame_sync_ext | input | for slave modules, this signal is connected to the tfpout port of the master. |
| tx_link_sync_in | input | transmit link status in. Enables the transmit state machines to move to PRESYNC state. |
| ferf | input | Far end receiver failure indication for final link synchronisation. |
| tx_sync_chain_in | input | transmit status chain in. |
| Tx_sync_chain_out | output | transmit status chain out. tx_sync_chain_in and tx_sync_chain_out are connected together for the master module. Each state ANDs the tx_sync_chain_in signal with its own status. |
| frame_sync_gate | output | active high for each for each frame period. |
| CASTE | generic integer | program the module as a master or a slave. |

Table 7 lists the states and codes of FSM 440. Signal Frame_sync_gate_int is an Internal framing pulse. Signal Frame_sync_disparity is a difference between Frame_sync_gate_int and Frame_sync_gate_ext. In the table, '1' denotes a signal in its active state, '0' inactive. This may not correspond with high and low logic levels within the design.

FIG. 6 is a state diagram illustrating the operation of the data link transmitter 400.

TABLE 7

TX Finite State Machine Transition Table

| Inputs | | | | |
|---|---|---|---|---|
| Clock | Reset | Frame_sync_gate_int | Frame_sync_gate_ext | Frame_sync_disparity |
| ↑ | 1 | X | X | X |
| ↑ | 0 | 1 | 1 | X |
| ↑ | 0 | X | X | 1 |
| ↑ | 0 | 1 | X | 0 |
| ↑ | 0 | X | X | 1 |
| ↑ | 0 | X | X | X |
| ↑ | 0 | 1 | X | 0 |
| ↑ | 0 | X | X | 1 |
| ↑ | 0 | X | X | X |
| ↑ | 0 | X | X | X |

TABLE 7-continued

TX Finite State Machine Transition Table

| Inputs | | State Variables | | Outputs | |
|---|---|---|---|---|---|
| Tx_link_sync_in | ferf | Current State | Next State | locked | Tx_lsync |
| X | X | X | HUNT | | |
| X | X | HUNT | PAIRSYNC | 0 | 0 |
| X | X | PAIRSYNC | HUNT | 1 | 0 |
| 1 | X | PAIRSYNC | PRESYNC | 1 | 0 |
| X | X | PRESYNC | HUNT | 1 | 0 |
| 0 | X | PRESYNC | HUNT | 1 | 0 |
| 1 | 0 | PRESYNC | LINKSYNC | 1 | 0 |
| X | X | LINKSYNC | HUNT | 1 | 1 |
| 0 | X | LINKSYNC | HUNT | 1 | 1 |
| X | 1 | LINKSYNC | HUNT | 1 | 1 |

Figure 7:
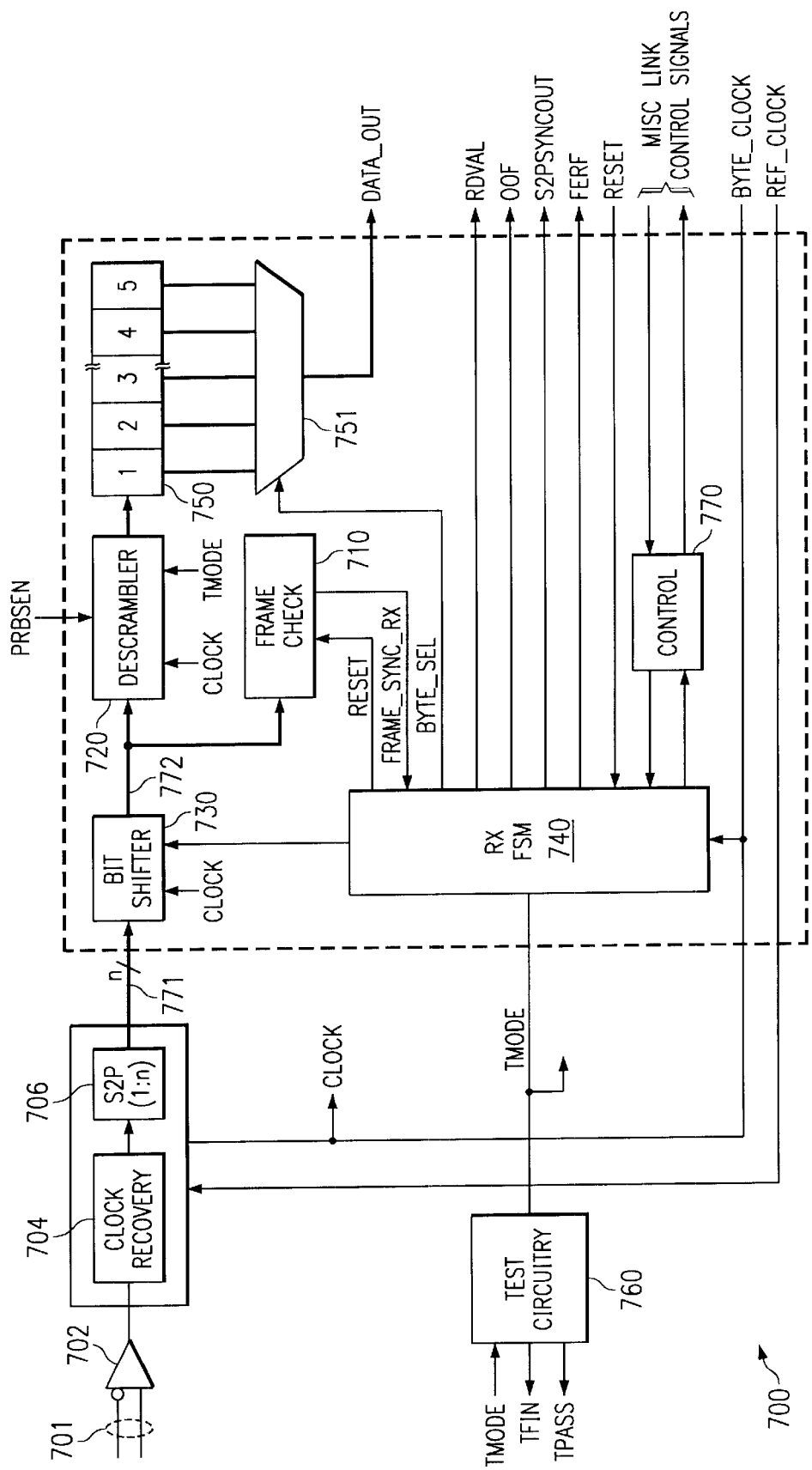
FIG. 7 is a more detailed block diagram of a data link receiver of FIG. 2.

FIG. 7 is a more detailed block diagram of data link receiver 700, which is the same as receivers 132a–132 of FIG. 2. Receiver 700 performs the following functions:

Receives the data sub-stream from physical media 701 in physical media interface circuit 702.

Recovers the data using an appropriate clock phase in clock recovery circuit 704.

Converts the serial data into byte data with an appropriate byte clock in serial-to-parallel circuit 706.

Recovers framing pulses in frame check circuit 710.

Recovers bit alignment from framing patterns in bit shifter 730.

Descrambles the encoded data in descrambler 720. Descrambler 720 descrambles the received data sub-stream in a complimentary manner to scrambler 420.

Recovers byte alignment by accounting for differential skew between links in byte pipe 750 in conjunction with tap point multiplexer 751.

Test circuit 760 provides methods for determining if receiver 700 is functioning properly.

FIG. 8 is a schematic illustrating interconnections of a plurality of data link receivers 700(i). Multiple receivers are cascaded to provide wide data-paths and data rates higher than that supported by any one data link technology, according to aspects of the present invention. One data link receiver is designated as the master receiver and the other receivers are designated slaves. This is done when the receivers are instantiated using a CASTE attribute. Alternatively, a CASTE signal can specify the type link.

Table 8 describes various signals which are connected to receiver 700 as shown on FIG. 7 and/or FIG. 8. All signals are active high unless explicitly stated otherwise.

TABLE 8

Receiver Interface Description

| Pin Name | Int/Ext | Input/Output | Description |
|---|---|---|---|
| RESET | Ext | Input | Reset signal for receive section |
| CLOCK | Ext | Output | Word clock. Derived from the transmit data and the local reference clock. |
| TMODE | Ext | Input | This signal places the receiver in test mode |
| TPASS | Ext | Output | Indicates a test pass. |
| TFIN | Ext | Output | Indicates test completion. |

TABLE 8-continued

Receiver Interface Description

| Pin Name | Int/Ext | Input/Output | Description |
|---|---|---|---|
| RDVAL | Ext | Output | This output defines when data is valid on the RDATA pins and may be used to interface directly with a FIFO. |
| S2PSYNCOUT | Int | Output | This signal is used to drive the S2PSYNCIN signals on all slave instances. It should be left unconnected on all instances except the master. |
| RFPIN | Int | Input | This signal is used to synchronize the byte alignment on slave instances. This should be tied FALSE on the master. |
| BLCIN | Int | Input | Byte Locked Chain In: Daisy chain which confers link byte lock status to the master |
| LBLIN | Int | Input | Link Byte Locked In: Multidrop signal driven by master to indicate the link is byte locked. |
| LSIN | Int | Input | Link Sync In: Multidrop signal driven by master to indicate the link is fully synchronized. |
| BLCOUT | Int | Output | See BLCIN. |
| LBLOUT | Int | Output | See LBLIN. Connected on master only. |
| LSOUT | Int | Output | See LSIN. Connected on master only. |
| RFPOUT | Int | Output | This signal is used to force alignment on the output bytes of all instances which form a link. It should be left unconnected on all instances except the master. |
| OOF | Ext | Output | These outputs indicate whether the respective receivers are in-frame |
| FERF | Ext/Int | Output | Far end Receiver Failure. This signal is used to convey downstream receiver failures to upper layers and to synchronize the flow of data. |
| PRBSEN | Ext | Input | This input may be used to disable the receive descrambler |
| DATA_IN | Int | Input | ((DATAPATH'high-1) downto 0) Received data from the S2P valid on the rising edge of WordClock. |
| DATA_OUT | Ext | Output | ((DATAPATH'high-1) downto 0) Receive data valid on the rising edge of WordClock when RDVAL is asserted. |

Figure 9:
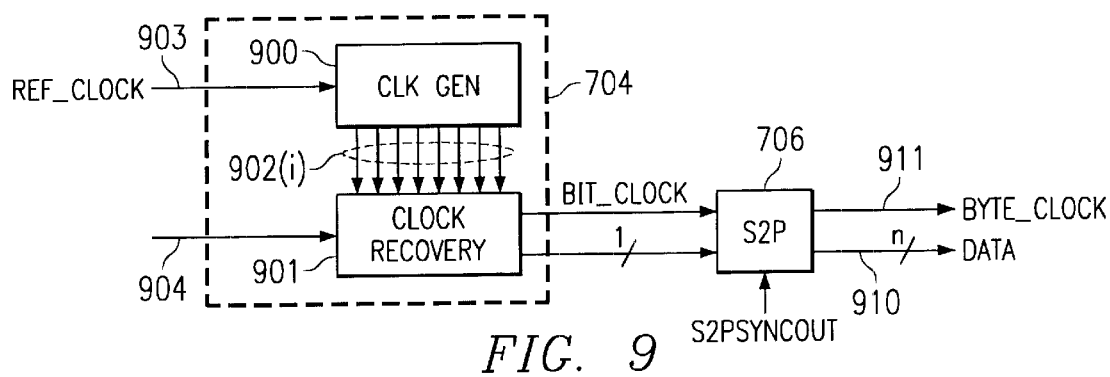
FIG. 9 is a more detailed block diagram of the clock recovery circuit for the receiver of FIG. 7.

FIG. 9 is a more detailed block diagram of the clock recovery circuit 704. Clock generator 900 generates a plurality of clock phase signals 902(i) based on reference clock 903 using known techniques. Each clock phase signal 902(i) differs in phase by approximately ⅛ of a bit period. Clock recovery circuit 901 then compares edge transitions on received data sub-stream 904 to each of clock phase signals 902(i) and selects a clock phase signal that is most in correspondence with the received data sub-stream. In this manner, a bit clock is formed that has a fixed time relation to local reference clock 903.

S2P circuit 706 then converts the serial received data sub-stream to a sequence of parallel data bytes on data bus 910. S2P 706 also forms byte clock on signal line 911 in response to the bit clock signal. When S2P circuit 706 is instantiated during the integrated circuit design process, the parallel data byte width (n) is selected, as discussed with reference to Table 15.

According to an aspect of the present invention, signal S2PSYNCOUT is provided by master receiver 700(0) and causes S2P circuit 706 to synchronize byte clock signal 911 with the byte clock signal of master receiver 700(0), as will be explained in more detail later.

Figure 10:
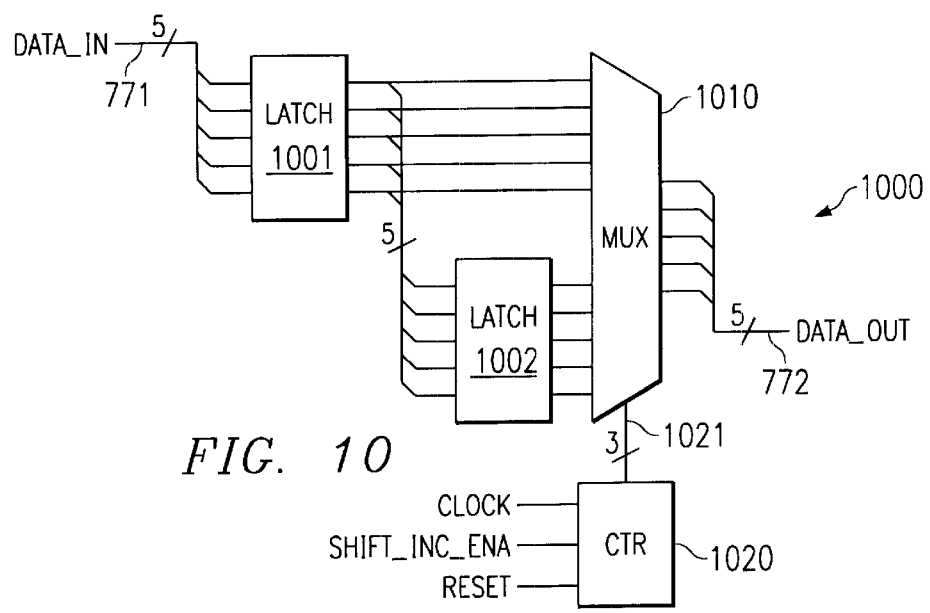
FIG. 10 is a schematic of the bit shifter for the receiver of FIG. 5.

FIG. 10 is a schematic of bit shifter circuitry 1000 that illustrates a byte data path width of five bits. Bit shifter circuitry 1000 provides a shiftable bit-tap point that is operable to align byte boundaries of the received data sub-stream with the byte clock of the receiver. Latches 1001 and 1002 are cascaded so that together they buffer ten bits of sequential data. Multiplexer 1010 is operable to tap any-five bits of data from latches 1001 and 1002 in response to select signal 1021 formed by counter 1020. The tap point is incremented in response to shift_inc_ena signals received from FSM 740. During synchronization, FSM 740 enables shifting of the tap point until a frame-sync-rx is asserted by frame check circuit 710 indicating that a frame pulse has been correctly received. Table 9 describes various signals associated with bit shift circuit 1000. All signals are active high unless explicitly stated otherwise.

TABLE 9

Bit Shifter Interface Description

| PORTS | TYPE | DESCRIPTION |
| --- | --- | --- |
| reset | input | synchronous reset |
| clock | input | internal clock |
| data_in | input | ((DATAPATH'high-1) downto 0) data bus from S2P module |
| shift_inc_ena | Input | one-bit shift enable (HUNT state only) |
| data_out | Output | ((DATAPATH'high-1) downto 0) data bus connected to the descrambler |

Frame check circuitry 710 produces frame synchronization pulses on signal line frame_sync_rx when a valid frame sequence has been received. These pulses are ungated and may occur outside the normal frame period. Table 10 describes signals associated with frame checker 710. All signals are active high unless explicitly stated otherwise.

TABLE 10

Frame Checker Interface Description

| PORTS | TYPE | DESCRIPTION |
| --- | --- | --- |
| clock | input | internal clock |
| reset | input | synchronous reset |

TABLE 10-continued

Frame Checker Interface Description

| PORTS | TYPE | DESCRIPTION |
| --- | --- | --- |
| frame_sync_gate | input | frame synchronisation pulse |
| data_in | input | ((DATAPATH'high-1) downto 0) data bus from dec_bit_shifter module |
| out_of_frame | input | receiver status signal |
| fvalid | output | frame valid signal |
| ferf | output | far end receiver failure signal |
| frame_sync_rx | output | signal active when a framing pulse is received. |

Byte pipeline 750 with byte tap point selected by multiplexer 751 is operable to delay the received data sub-stream a number of bytes equal to the depth of the pipe. The tap point is selected in response to the frame check circuitry so that the received data sub-stream is frame synchronized with the received data sub-stream of the master link. This process will be described in detail later. The depth of the pipeline is specified when the integrated receiver 700 is instantiated during design of an integrated circuit.

It is this pipeline depth which defines the amount of skew which can be tolerated between the data links, according to an aspect of the present invention. The tap point for this pipeline is set by FSM 740. When appropriate, the master shifts its tap point as well as the slaves. This occurs over a time period sufficient to allow all the slaves to cycles through all possible relative skews on each master tap point. The absolute maximum synchronization lock time is therefore proportional to the number of pipeline stages and the frame length. The pipeline also delays control information frame_sync_out and rdval_out to assure correct synchronization and alignment with the receive data valid signal.

Table 11 describes signals associated with byte pipe 750. All signals are active high unless explicitly stated otherwise.

TABLE 11

Byte Pipeline Interface Description

| PORTS | TYPE | DESCRIPTION |
| --- | --- | --- |
| reset | input | synchronous reset |
| clock | input | internal clock |
| data_in | input | ((DATAPATH'high-1) downto 0) data bus from descrambler module |
| Frame_sync_rx | input | a framing pulse is received |
| rdval_in | input | data valid when there is no framing pulse |
| byte_sel | input | Selecter for the pipeline stage tap point. |
| frame_sync_out | output | connected to RFPOUT top-level signal. This signal is used to force alignment on the output bytes of all slave instances of a link. |
| fvalid | input | frame valid, used to gate rdval. |
| rdval_out | output | ready data output |
| data_out | output bus | received data valid |

When test mode is enabled, test circuitry 760 checks for set bits in the descrambled data stream. Any set bits found are erroneous when the transmitter is also in test mode. Test status is conveyed to the core via signals tpass and tfin and may also be read by the scan chain, not shown. Table 12 describes signals associated with test circuitry 760. All signals are active high unless explicitly stated otherwise.

A single test is initiated by asserting the TMODE pin on the transmitter and receiver. This test uses 16 byte frames to provide a faster method of achieving synchronization. Both transmitter and receiver must be placed into test mode as the transmitter must be inhibited from transferring user data.

Once the system is synchronized an all zero frame is transferred over the channel and the descrambled results are checked for set bits. Any set bits will result in a test failure, which will be conveyed via TPASS. Resetting the TMODE pin will result in loss of synchronization and therefore a delay before user data transfer may be resumed.

Testing is done in conjunction with scan chains and may involve, for example, one of the following:

Integration into an existing scan chain

Integration into an additional scan chain

Integration in the boundary scan chain indexed by a particular instruction code within an IEEE1149.1 implementation.

Communication channel 110/111 supports both clocked scan and multiplexed flip flop test insertion.

TABLE 12

Built-in Tester Interface Description

| PORTS | TYPE | DESCRIPTION |
|---|---|---|
| reset | input | Synchronous reset |
| clock | input | Internal clock |
| data_in | input | ((DATAPATH'high-1) downto 0) Data bus from S2P module |
| tmode | input | Enable test mode |
| prbsen | input | PRBSEN recovered from the frame header |
| tpass | output | Test passed |
| tfin | output | Test phase complete |

Receive Finite State Machine 740 controls the operation of receiver 700. Table 13 describes signals associated with FSM 740.

TABLE 13

Receiver Finite State Machine Interface Description

| PORTS | TYPE | DESCRIPTION |
|---|---|---|
| reset | input | synchronous reset |
| clock | input | internal clock |
| tmode | input | Test mode input |
| frame_sync_rx | input | Framing pulse is received |
| external_frame_rx | input | A framing pulse is received from the master. Used to synchronize byte alignment on slave instances |
| byte_locked_chain_in | input | Enables master to determine when a link can transition from PREBYTESYNC to PRESYNC. Daisy chain which confers link byte lock status to the master. |
| byte_locked_chain_out | output | see above |
| delta_counted_chain_in | input | Enables masters to determine when link can transition from PRESYNC to SYNC. Daisy chain which confers link delta count status to the master |
| delta_counted_chain_out | output | see above |
| link_byte_locked_in | input | multidrop signal driven by the master to indicate the link is byte locked |
| link_byte_locked_out | output | see above. Connected on master only |
| link_sync_in | input | multidrop signal driven by the master to indicate the link is fully synchronized. |
| link_sync_out | output | see above. Connected on master only |
| byte_sel | Output | (($\log_2$PIPELINE_WIDTH)-1 downto 0) select one byte among the pipeline ones. |
| out_of_frame | output | indicates that the receiver is in or out of frame |
| s2p_sync_out | output | master sync output to ensure that S2P byte clocks are sufficiently aligned. |
| frame_sync_gate | output | valid during the frame sync pulse. |
| frame_sync_valid_gate | output | a frame periodic signal valid for a single clock cycle. |
| bit_shift_inc_ena | output | shift enable for Bit Shifter Module |
| post_ds_frame_sync valid_gate | input | Frame_sync_valid_gate delayed by the latency of the descrambler. Used for byte alignment purposes. |
| CASTE | generic integer | programs the module as a master or a slave. |

Figure 11:
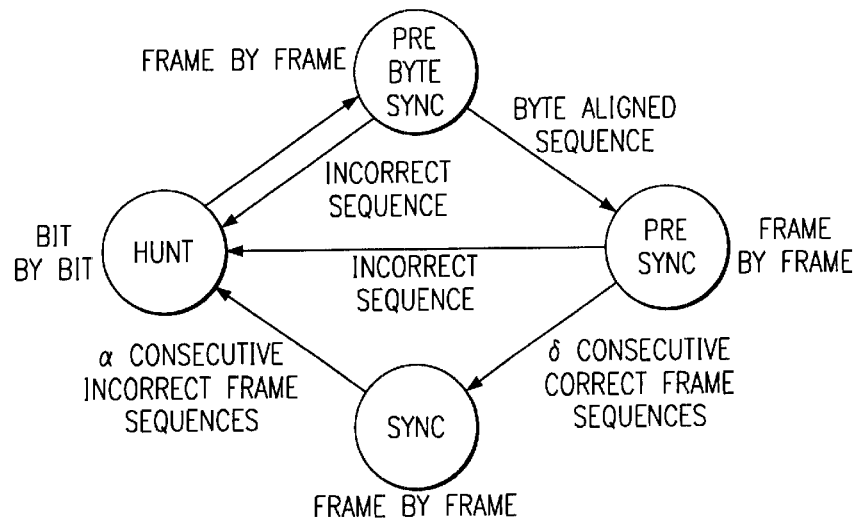
FIG. 11 is a state diagram which controls the synchronization process of the communication channel of FIG. 2.

FIG. 11 is a state diagram which controls the synchronization process of receiver 700 The framing patterns are sent at a rate set when transmitter 400 is instantiated, as specified by the frame_count_c variable of Table 15.

Table 14 provides a detailed description of the state transitions of FSM 740.

TABLE 14

Receiver FSM state table

| Inputs | | | | | | |
|---|---|---|---|---|---|---|
| Clock | Reset | Shift_inc_ena_int | Frame_sync_rx | Frame_sync_gate_int | Frame_sync_disparity |
| ↑ | 1 | X | X | X | X |
| ↑ | 1 | 1 | 0 | X | X |

TABLE 14-continued

Receiver FSM state table

| | | | | | |
|---|---|---|---|---|---|
| ↑ | 1 | 0 | 0 | X | X |
| ↑ | 1 | 1 | 1 | X | X |
| ↑ | 1 | 0 | 1 | X | X |
| ↑ | 1 | X | X | X | 1 |
| ↑ | 1 | X | X | X | 0 |
| ↑ | 1 | X | X | X | 1 |
| ↑ | 1 | X | X | X | 0 |
| ↑ | 1 | X | X | X | 0 |
| ↑ | 1 | X | 0 | X | 0 |
| ↑ | 1 | X | 0 | X | 0 |
| ↑ | 1 | X | 0 | X | 0 |
| ↑ | 1 | X | X | 0 | 0 |
| ↑ | 1 | X | X | 0 | 0 |
| ↑ | 1 | X | X | 0 | 0 |
| ↑ | 1 | X | 1 | 1 | 0 |
| ↑ | 1 | X | 1 | 1 | 0 |
| ↑ | 1 | X | 1 | 1 | 0 |
| ↑ | 1 | X | 0 | X | 1 |
| ↑ | 1 | X | 0 | X | 1 |
| ↑ | 1 | X | 0 | X | 1 |
| ↑ | 1 | X | X | 0 | 1 |
| ↑ | 1 | X | X | 0 | 1 |
| ↑ | 1 | X | X | 0 | 1 |
| ↑ | 1 | X | 1 | 1 | 1 |
| ↑ | 1 | X | 1 | 1 | 1 |
| ↑ | 1 | X | 1 | 1 | 1 |

| Inputs | | | State Variables | |
|---|---|---|---|---|
| Link_byte_locked_in | Link_sync_in | Alpha_count_reached | Current State | Next state |
| X | X | X | X | X |
| X | X | X | H | H |
| X | X | X | H | H |
| X | X | X | H | PB |
| X | X | X | H | PB |
| X | X | X | PB | H |
| 1 | X | X | PB | PS |
| X | X | X | PS | H |
| 0 | X | X | PS | PB |
| 1 | 1 | X | PS | S |
| 0 | X | X | S | H |
| X | 0 | X | S | H |
| X | X | 1 | S | H |
| 0 | X | X | S | H |
| X | 0 | X | S | H |
| X | X | 1 | S | H |
| 0 | X | X | S | H |
| X | 0 | X | S | H |
| X | X | 1 | S | H |
| 0 | X | X | S | H |
| X | 0 | X | S | H |
| X | X | 1 | S | H |
| 0 | X | X | S | H |
| X | 0 | X | S | H |
| X | X | 1 | S | H |
| 0 | X | X | S | H |
| X | 0 | X | S | H |
| X | X | 0 | S | H |

| Outputs | | | | |
|---|---|---|---|---|
| Bit_shift_inc_ena | Byte_shift_inc_ena | Byte_shift_reset | Alpha_count_ena | Alpha_count_reset |
| 1 | 0 | 1 | 0 | 1 |
| 0 | 0 | 1 | 0 | 1 |
| 1 | 0 | 1 | 0 | 1 |
| 0 | 0 | 1 | 0 | 1 |
| 0 | 1 | 0 | 0 | 1 |
| 0 | 1 | 0 | 0 | 1 |
| 0 | 0 | 0 | 0 | 1 |
| 0 | 0 | 0 | 0 | 1 |
| 0 | 0 | 0 | 0 | 1 |
| 0 | 0 | 0 | 0 | 0 |
| 0 | 0 | 0 | 0 | 0 |

TABLE 14-continued

Receiver FSM state table

| | | | | |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 1 |
| 0 | 0 | 0 | 0 | 1 |
| 0 | 0 | 0 | 0 | 1 |
| 0 | 0 | 0 | 1 | 0 |
| 0 | 0 | 0 | 1 | 0 |
| 0 | 0 | 0 | 1 | 0 |
| 0 | 0 | 0 | 1 | 0 |
| 0 | 0 | 0 | 1 | 0 |
| 0 | 0 | 0 | 1 | 0 |
| 0 | 0 | 0 | 1 | 1 |
| 0 | 0 | 0 | 1 | 1 |
| 0 | 0 | 0 | 1 | 1 |

Outputs

| Delta_count_ena | Delta_count_reset | S2p_sync_out | Out_of_frame | Frame_count_reset |
|---|---|---|---|---|
| 0 | 1 | 1 | 1 | 0 |
| 0 | 1 | 1 | 1 | 0 |
| 0 | 1 | 1 | 1 | 1 |
| 0 | 1 | 1 | 1 | 1 |
| 0 | 1 | 0 | 1 | 0 |
| 0 | 1 | 0 | 1 | 0 |
| 1 | 0 | 0 | 1 | 0 |
| 1 | 0 | 0 | 1 | 0 |
| 1 | 0 | 0 | 1 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |

The various states illustrated by FIG. 11 and Table 15 are as follows:

HUNT (H): During this state the framing sequence is hunted on a bit-by-bit basis. Scrambling is disabled. When a correct framing sequence is identified the state changes to PREBYTESYNC.

PREBYTESYNC (PB): During this period the state machine shifts the tap point of the byte pipeline until the framing sequences are aligned with the RFPIN (receive framing pulse—driven by the master).

PRE SYNC (PS): During this period the frame header sequences are checked frame by frame. An incorrect framing sequence results in a return to the HUNT state. δ correct frame sequences complete on all pairs will cause transition to state SYNC. δ is the max_delta_count_c variable specified when receiver 700 is instantiated, as described in Table 15.

SYNC (S): The scrambler is enabled. α errored frame sequences will cause the state to return to HUNT. α is the MAX_ALPHA_COUNT_C variable specified when receiver 700 is instantiated, as described in Table 15.

A counter in control circuitry 770 continually monitors progress through a frame. Two strobes are generated which are used throughout the design for timing purposes, as follows:

Frame_sync_gate is a signal which is active during framing pulses and is used to gate the outputs from the frame checking logic.

Frame_sync_valid_gate is a signal which is active in the clock cycle immediately following the framing pulse.

One chain, byte locked chain (blcin/blcout), is used to interconnect a plurality of receivers 700, as illustrated in FIG. 8. Master and slave behavior differs slightly. In the master the chain output reflects its own status, on a slave the chain output represents the chain input ANDed with the its own status.

The master uses the chain input to drive the multidrop signals (RFPOUT and S2PSYNCOUT) used in the PREBYTESYNC⇒PRESYNC and PRESYNC⇒SYNC state transitions.

Figure 12:
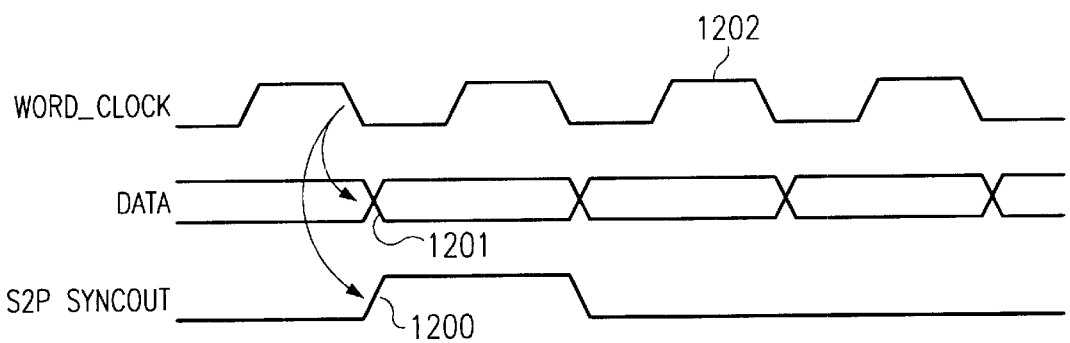
FIG. 12 is a timing diagram illustrating S2PSyncOut signal timing.

Link synchronization, according to aspects of the present invention, will now be described in detail. During link synchronization the master receiver issues a pulse on signal S2PSyncOut which resynchronizes all slave S2P devices. This is to ensure that a single word clock 1202 may be used to reliably clock all the bytes. The timing of this signal is shown in FIG. 12, illustrating S2PSyncOut signal timing. This resynchronization strobe is active when the master is in the HUNT state, and is responsive to the word clock signal, as indicated at 1200. Word clock 1202 is the inverse of the byte clock of master receiver 700(0). Due to bit synchronization of master receiver 700, data bytes in the master data sub-stream are synchronized with the byte clock of master receiver 700, as indicated at 1201.

Figure 13:
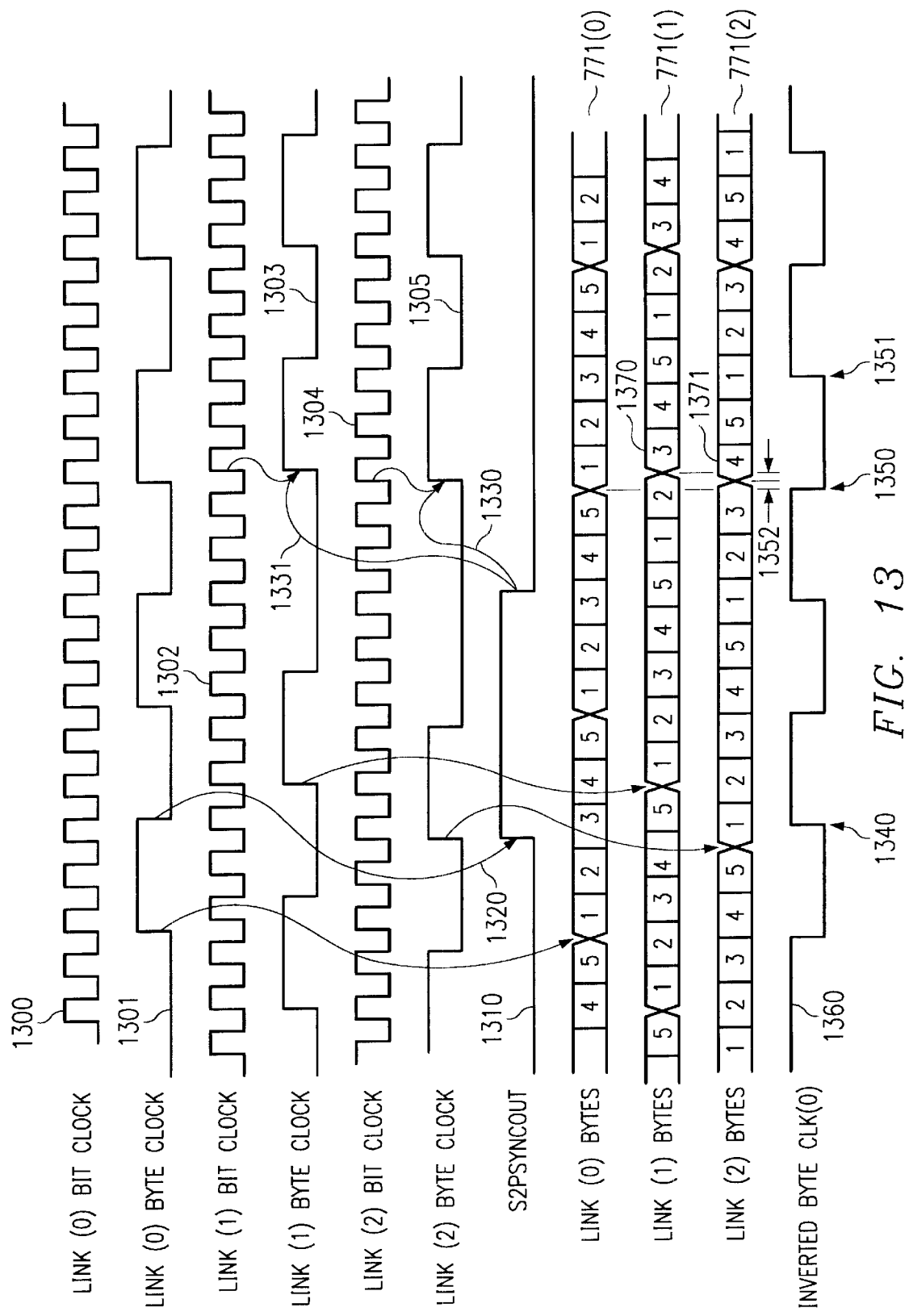
FIG. 13 is a timing diagram illustrating byte clock synchronization of the plurality of data links of FIG. 2, according to an aspect of the present invention.

FIG. 13 is a timing diagram illustrating byte clock synchronization of the plurality of data links of FIG. 2, according to an aspect of the present invention. Timing for only three links are illustrated, but it is understood that any number of links can be synchronized in a similar manner. Before link synchronization, each of the links recover a bit clock 1300, 1302, and 1304 as discussed earlier. Each link then forms a byte clock 1301, 1303 and 1305, but the timing of each byte clock signal is not related to the others, as illustrated in FIG. 13. Therefore, disadvantageously, a single clock can not be reliably used to clock all of the received data sub-streams of digital system node 130, as shown at time 1340.

As discussed above, S2PSYNCOUT signal 1310 is asserted during the HUNT state of the master and sent to the slave data receivers at time 1320. This connection is shown in FIG. 8. S2P 706(i) in each slave receiver 700(i) is operable to reset its own byte clock counter in response to the S2PSYCOUT signal 1310. Thus, each slave receiver realigns its byte clock as shown at 1330 and 1331 to approximately align with the byte clock of the master receiver. Also, each S2P 706(i) places a new data byte on its data_out bus 771(i) in accordance with the realigned byte clocks, as shown at time 1350. Thus, advantageously and according to an aspect of the present invention, a single inverted byte clock 1360 can be used to clock the data sub-streams of all of the receivers, as shown at time 1351. This single byte clock is also referred to as the word clock. While the data transitions at time 1350 have a jitter 1352, reliable clocking at time 1351 is assured.

However, the data bytes framed by the byte clocks do not necessarily correspond to the underlying data sub-stream. For example, link(1) bytes now begin at bit 3 as shown at 1370, for example. Likewise, link(2) bytes begin a bit 4 at 1371, for example.

Figure 14:
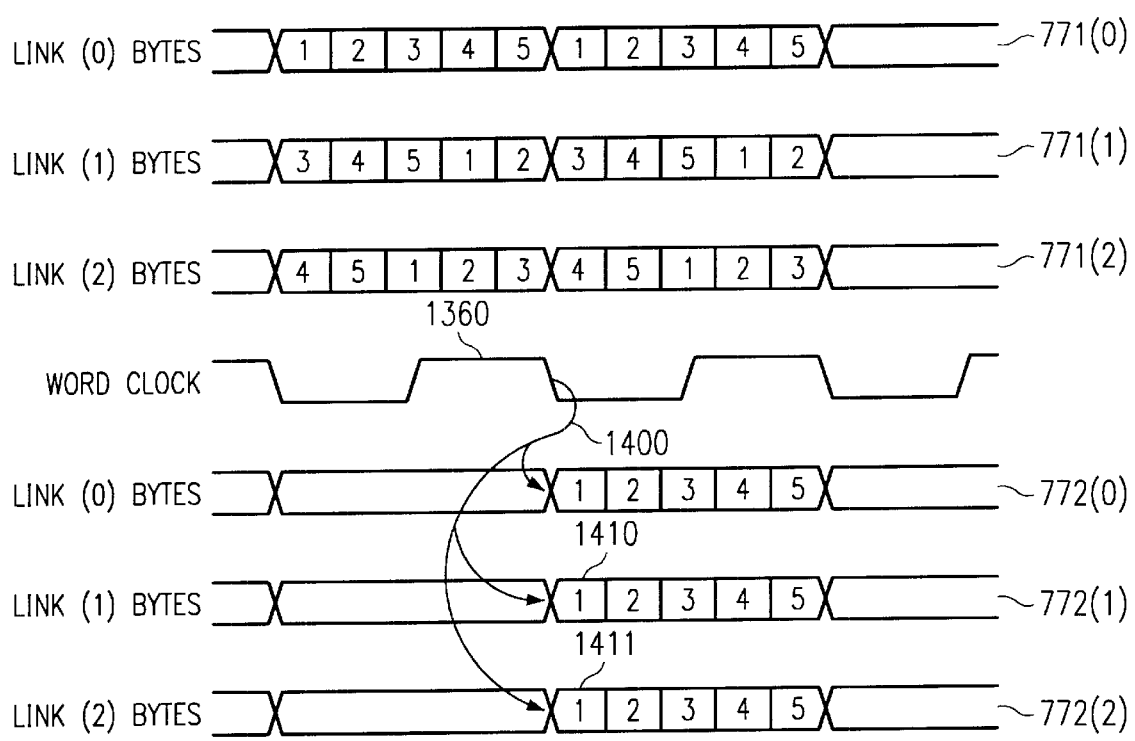
FIG. 14 is a timing diagram illustrating bit rotation of the plurality of data links of FIG. 2 to produce byte alignment to a common word clock, according to an aspect of the present invention.

FIG. 14 is a timing diagram illustrating bit rotation of the plurality of data links of FIG. 2 to produce byte alignment to common byte clock 1360, according to an aspect of the present invention. As discussed earlier, the bit tap point of bit shifter circuitry 730 in each receiver is set to align byte boundaries of the received data sub-stream with word clock 1360, as shown at 1400. In FIG. 14, signals 771(i) are the link(i) byte signals on bus 771 of FIG. 7 and signals 772(i) are the rotated link(i) byte signals on bus 772 of FIG. 7. Now, advantageously, link(1) bytes begin with bit 1 as shown at 1410 and link(2) bytes also begin with bit 1, as shown at 1411.

Thus, according to an aspect of the present invention, each data link now provides a sub-stream of correctly ordered bytes that can be combined to form a single received data stream of ordered data that can be reliably clocked with a single clock into a single processing circuit, such as single FIFO 170 of FIG. 2. However, different inherent delays in each data link may result in byte skews between received data sub-streams.

FIG. 15 is a timing diagram illustrating frame synchronization of the plurality of data links of FIG. 2 in order to remove unwanted byte skew between received data sub-streams, according to an aspect of the present invention.

Figure 15A:
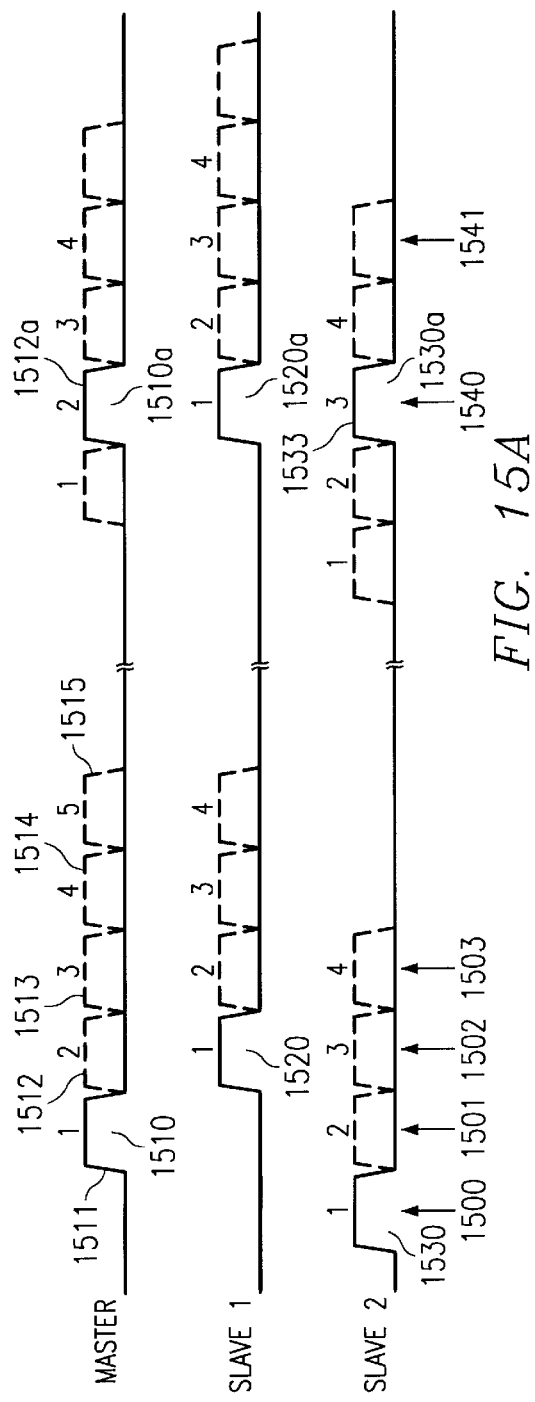
FIG. 15 is a timing diagram illustrating frame synchronization of the plurality of data links of FIG. 2, according to an aspect of the present invention.

In FIG. 15A, which illustrates only three links for clarity, a master link has a frame pulse 1510 at time 1501, while slave link(1) has a frame pulse 1520 at time 1502, and slave link(2) has a frame pulse 1530 at time 1500. Clearly, three data bytes clocked (one byte from each link) at time 1503, for example, will not be correctly ordered.

Still referring to FIG. 15A, according to an aspect of the present invention, receiver 700 has a byte pipe 750 which has several tap points, as discussed earlier. Five are illustrated (1511–1514), but other embodiments can have fewer or more, as indicated in Table 15. Advantageously, by selecting tap point 2 on the master, illustrated at 1512a, and tap point 3 on slave 2, illustrated at 1533, all three frame pulses 1510a, 1520a and 1530a are aligned at time 1540. Therefore, three data bytes clocked at time 1503, for example, will be correctly ordered, according to an aspect of the present invention.

Figure 15B:
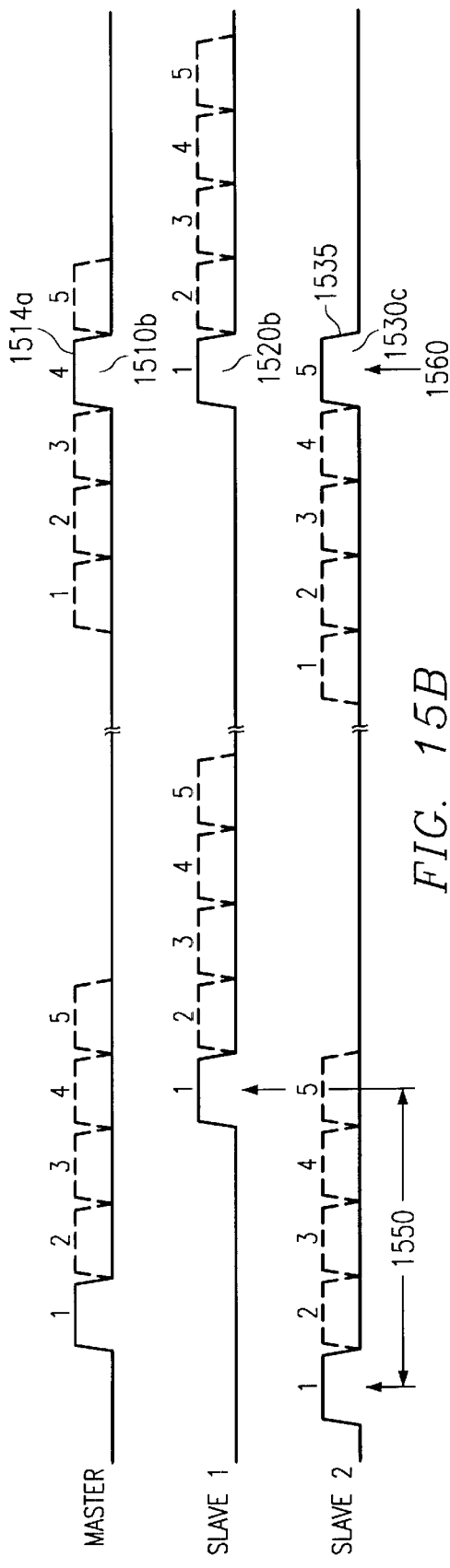

Likewise, refering to FIG. 15B, a skew 1550 of up to four bytes can be corrected with a pipe having five tap points. By selecting tap point 5 illustrated at 1535, and by selecting tap point 4 illustrated at 1514a, all three frame pluses 1510b, 1520b, and 1530b are aligned at time 1560.

Therefore, as the length of byte pipe 750 is increased in each receiver, the amount of data link skew that can be tolerated is increased, according to an aspect of the present invention.

FIGS. 16A–16C are flow charts illustrating the process of synchronizing the byte clock and frame pulse of each received data sub-stream to the byte clock and frame pulse of the master received data sub-stream such that data skew is eliminated. FIG. 16A is a flow chart illustrating the process of byte aligning a plurality of data links. In step 1600, a data transmission channel is instantiated using multiple data links. In step 1602, transmission is begun on each link pair with stuff characters in the payload and the framing pulses on all links synchronized. In step 1604, each receiver is synchronized to the data sub-stream using stuff characters to recover a bit clock relative to a receiver local reference clock. In step 1606, a byte clock is formed on each link relative to that link's bit clock. In step 1608, slave link byte clocks are synchronized to a master link byte clock. In step 1610, a test is performed to determine if a frame pulse is being received on each link(i). If not, a bit tap point on link(i) is shifted to rotate data bytes until a frame pulse is recognized. At this point, all links are now synchronized to a common word clock and the byte_locked_chain is asserted at step 1614, according to. an aspect of the present invention.

FIG. 16B is a flow chart illustrating the process of frame synchronization used in each slave link. After each slave link has successfully byte aligned itself at step 1614, the master asserts signal LBLOUT and a test is performed by each slave(i) to determine if slave(i) is in frame sync with the master at step 1620. If not, at step 1622 the byte tap point of each slave(i) is shifted until frame synchronization is detected. Once each slave(i) is frame synchronized, it asserts its portion of the link_byte_locked chain and waits in step 1624 for the master to assert signal LSOUT indicating all slave(i) are frame synchronized. Once this occurs, each slave data link begins to transmit payload data over the synchronized channel.

FIG. 16C is a flow chart illustrating the process of frame synchronization used in the master link. After all slave links are byte aligned at step 1614, the master link asserts the LBLOUT signal to start the frame synchronization process at step 1640 and then waits two frames at step 1642. The master then monitors the link_byte_locked chain to determine if all slaves are in frame sync with master at step 1644.

If not, then the master shifts its byte tap point one position at step 1646, waits two frames at step 1642 while each of the slave links again attempt to frame synchronize by each performing steps 1620, 1622, and 1624. The master again monitors the link_byte_locked chain to determine if all slaves are in frame sync with master at step 1644. The master repeats steps 1644 and 1646 until all slave links are frame synchronized, or until the master selects the last byte tap point, such as tap point 1514 of FIG. 15A. Once the link_byte_locked chain is asserted, then the master waits a preselected number of additional frames at step 1648 while each data link monitors itself for framing errors, and then the master asserts signal LSOUT at step 1650 and all links begin to transmit payload data over the synchronized channel at step 1652 and step 1626. The preselected number may be five, for example; other embodiments may wait a different number of additional frame at step 1648. In Table 15, the max_delta_count_c parameter specifies the preselected number of additional frames to wait for.

The number of data links needed in a digital system is determined by the bandwidth requirement of the data stream and the capabilities of the physical media and the transmitter/receiver. Referring back to FIG. 2, other embodiments may have more or fewer data links. To achieve both a specified word width m and a system specified bit rate it may be necessary to adjust the width n of the parallel bytes transmitted on each link 110(i).

Example: 16 bit interface at 75 MHz on a technology with a maximum individual data link capacity of 400 Mbps.

Channel bandwidth requirement: 1200 Mbps

Assume the number of links is i=3. This gives a per pair bandwidth of 400 Mbps which is within the capabilities of the technology. However, since 16/3 is not an integer it is necessary to increase the amount of bits per link to 6, giving an 18 bit wide interface (i.e. two spare bits).

The required bandwidth including this overhead is then . . .

18/16 * 1200 Mbps=1350 Mbps

Per link bandwidth: 450 Mbps

This is now not viable with the chosen technology. The only option on this technology node is to increase the link count to four with four bit wide datapaths. There are now no spare bits and a throughput requirement for each link is only 300 Mbps.

The parameters listed in Table 15 are passed to the computer assisted design (CAD) software in the autogeneration phase of an integrated circuit which will have a communication channel 110. Based on the selected parameters, an embodiment of the present invention is created using design cells from a macro design library.

Fabrication of digital system 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which, may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

An advantage of the present invention is that it is applicable to various physical media, such as wire cables, optical cables, laser optic links, infrared links, radio or microwave links, backplanes, etc.

Each link can use single ended signaling or differential signaling, for example.

Another aspect of the present invention is that the single stream of ordered word data can be divided into a plurality of data sub-streams using different techniques on different embodiments. For example, in the described embodiment each word of the data stream was divided into bytes with a bit length equal to the data path width of each data link. In another embodiment, a preselected number of words may be grouped as a single item and then divided into bytes with a bit length equal to the data path width of each data link. In another embodiments, a first portion of a word may be divided into bytes with a bit length equal to the data path width of each data link, and then a second portion of the same word may be divided into bytes, etc. Other schemes for dividing a single stream of data into multiple sub-streams are included within the scope of the present invention.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art

TABLE 15

Scalable Parameters

| Generic | Type | Range | Description |
| --- | --- | --- | --- |
| DATAPATH_WIDTH | INTEGER | 4 to 10 | The width of the internal parallel datapath |
| GENERATOR_POLYNOMIAL | GEN_T | | The generator polynomial to be used in the scrambler and descrambler |
| PIPELINE_DEPTH | INTEGER | | The number of byte stored in the receiver pipeline |
| FRAME_COUNT_C | INTEGER | | The frame period in number of clock cycles |
| MAX_DELTA_COUNT_C | INTEGER | 1 to 7 | Number of correct frames required to pass from PRESYNC to SYNC states |
| MAX_ALPHA_COUNT_C | INTEGER | 1 to 7 | Number of correct frames required to pass from SYNC to HUNT states | upon reference to this description. It is therefore contemplated that the appended claims will cover any such modifications of the embodiments as fall within the true scope and spirit of the invention.

Although the present invention and its advantages have been described in detail, it should be understood that various changes, substitutions and alterations can be made herein without departing from the spirit and scope of the invention as defined by the appended claims.

What is claimed is:

1. A method for transferring a single stream of ordered data over a plurality of data links each having a transmitter and a receiver, wherein the single stream of data comprises a plurality of words each having a plurality of bits, comprising the steps of:

dividing the single stream of data into a plurality of sub-streams of data;

inserting a frame pulse periodically in each sub-stream of data;

transmitting each sub-stream of data over a corresponding data link of the plurality of data links in a parallel manner;

receiving each sub-stream of data to form a plurality of received data sub-streams, wherein a first data link has a first delay time that is different from a second delay time of a second data link, such that a data skew occurs between a first received data sub-stream and a second received data sub-stream;

recovering a byte clock from each received data sub-stream;

synchronizing the byte clock and frame pulse of each received data sub-stream to the byte clock and frame pulse of the first received data sub-stream such that the data skew is eliminated; and combining the plurality of received data sub-streams to form a single received stream of ordered data; and wherein the step of synchronizing comprises the steps of:
 a) testing for frame synchronization by determining if the frame pulse of each of the received data sub-streams is synchronized with the frame pulse of the first received data sub-stream;
 b) shifting a byte tap point in each of the received data sub-streams other than the first received data sub-stream up to a first number of times until each received data sub-stream is frame synchronized with the first received data sub-stream;
 c) detecting a lack of frame synchronization when all received data sub-streams are not frame synchronized after the step of shifting a byte tap point a first number of times;
 d) shifting a byte tap point in the first received data sub-stream by one position after the step of detecting a lack of frame synchronization; and
 e) then repeating step b until each received data sub-stream is frame synchronized with the first received data sub-stream.

2. A method for receiving a single stream of ordered data over a plurality of data links each having a transmitter and a receiver, wherein the single stream of data comprises a plurality of words each having a plurality of bits, and wherein the single stream of data is divided in a plurality of sub-streams of data with a frame pulse inserted periodically in each sub-stream of data, comprising the steps of:

receiving each sub-stream of data over a corresponding data link of the plurality of data links in a parallel manner to form a plurality of received data sub-streams, wherein a first data link has a first delay time that is different from a second delay time of a second data link, such that a data skew occurs between a first received data sub-stream and a second received data sub-stream;

recovering a byte clock from each received data sub-stream;

synchronizing the byte clock and frame pulse of each received data sub-stream to the byte clock and frame pulse of the first received data sub-stream such that the data skew is eliminated; and combining the plurality of received data sub-streams to form a single received stream of ordered data; and wherein the step of synchronizing comprises the steps of;
 a) testing for frame synchronization by determining if the frame pulse of each of the received data sub-streams is synchronized with the frame pulse of the first received data sub-stream;
 b) shifting a byte tap point in each of the received data sub-streams other than the first received data sub-stream up to a first number of times until each received data sub-stream is frame synchronized with the first received data sub-stream;
 c) detecting a lack of frame synchronization when all received data sub-streams are not frame synchronized after the step of shifting a byte tap point a first number of times;
 d) shifting a byte tap point in the first received data sub-stream by one position after the step of detecting a lack of frame synchronization; and
 e) then repeating step b until each received data sub-stream is frame synchronized with the first received data sub-stream.

3. The method according to claim 1, wherein the step of synchronizing further comprises the steps of:

forcing the byte clock of each data link to align approximately with the byte clock of the first data link; and shifting a bit tap point on each received data sub-stream so that byte boundaries of each received data sub-stream align with the byte clock associated with each received data sub-stream.

4. The method according to claim 1, further comprising the step of repeating the steps c, d, and e up to a second number of times until each received data sub-stream is frame synchronized with the first received data sub-stream.

5. The method according to claim 2, wherein the step of synchronizing further comprises the steps of:

forcing the byte clock of each data link to align approximately with the byte clock of the first data link; and shifting a bit tap point on each received data sub-stream so that byte boundaries of each received data sub-stream align with the byte clock associated with each received data sub-stream.

6. The method according to claim 2, further comprising the step of repeating the steps c, d, and e up to a second number of times until each received data sub-stream is frame synchronized with the first received data sub-stream.

7. A digital system having a first node and a second node and a communication channel connected between operable to transfer a single stream of ordered data over the communication channel, wherein the single stream of data comprises a plurality of words each having a plurality of bits, wherein the communication channel further comprises:

circuitry for dividing the single stream of ordered data into a plurality of sub-streams of data;

a plurality of data links each having a transmitter and a receiver, the plurality of data links operable to transmit each sub-stream of data over a corresponding data link of the plurality of data links in a parallel manner to form a plurality of received data sub-streams, wherein a first data link has a first delay time that is different from a second delay time of a second data link, such that a data skew occurs between a first received data sub-stream and a second received data sub-stream;

circuitry for inserting a frame pulse periodically in each sub-stream of data connected to each transmitter;

circuitry for combining the plurality of received data sub-streams connected to each receiver to form a single received stream of ordered data;

wherein each receiver further comprises:
  circuitry for recovering a byte clock from the received data sub-stream; and
  circuitry for synchronizing the byte clock and frame pulse of each received data sub-stream to the byte clock and frame pulse of a preselected master one of the receivers such that the data skew is eliminated; wherein the circuitry for synchronizing is operable to perform the steps of:
    a) testing for frame synchronization by determining if the frame pulse of each of the received data sub-streams is synchronized with the frame pulse of the first received data sub-stream;
    b) shifting a byte tap point in each of the received data sub-streams other than the first received data sub-stream up to a first number of times until each received data sub-stream is frame synchronized with the first received data sub-stream;
    c) detecting a lack of frame synchronization when all received data sub-streams are not frame synchronized after the step of shifting a byte tap point a first number of times;
    d) shifting a byte tap point in the first received data sub-stream by one position after the step of detecting a lack of frame synchronization; and
    e) then repeating step b until each received data sub-stream is frame synchronized with the first received data sub-stream.

8. The digital system according to claim 7, wherein the circuitry for synchronizing comprises:
  circuitry for forcing the byte clock of the receiver to align approximately with the byte clock of the master receiver; and
  bit shifter circuitry with a bit tap point operable to align byte boundaries of the received data sub-stream with the byte clock of the receiver.

9. The digital system according to claim 8, wherein the synchronizing circuitry further comprises:
  frame check circuitry operable to test for frame synchronization by determining if the frame pulse of the received data sub-stream is synchronized with the frame pulse of the master receiver; and
  a byte pipe with a byte tap point operable to delay the received data sub-stream a first number of bytes in response to the frame check circuitry so that the received data sub-stream is frame synchronized with the received data sub-stream of the master receiver.

10. A digital system having a communication channel, the digital system being operable to receive a single stream of ordered data over the communication channel, wherein the single stream of data comprises a plurality of words each having a plurality of bits, wherein the communication channel further comprises a plurality of receivers, each receiver operable to receive a data sub-stream, each receiver comprising:
  circuitry for recovering a byte clock from the received data sub-stream; and
  circuitry for synchronizing the byte clock and frame pulse of each received data sub-stream to the byte clock and frame pulse of a preselected master one of the receivers such that the data skew is eliminated, the circuitry for synchronizing comprising:
    circuitry for forcing the byte clock of the receiver to align approximately with the byte clock of the master receiver; and
  bit shifter circuitry with a bit tap point operable to align byte boundaries of the received data sub-stream with the byte clock of the receiver; and
  wherein the circuitry for synchronizing is operable to perform the steps of:
    a) testing for frame synchronization by determining if the frame pulse of each of the received data sub-streams is synchronized with the frame pulse of the first received data sub-stream;
    b) shifting a byte tap point in each of the received data sub-streams other than the first received data sub-stream up to a first number of times until each received data sub-stream is frame synchronized with the first received data sub-stream;
    c) detecting a lack of frame synchronization when all received data sub-streams are not frame synchronized after the step of shifting a byte tap point a first number of times;
    d) shifting a byte tap point in the first received data sub-stream by one position after the step of detecting a lack of frame synchronization; and
    e) then repeating step b until each received data sub-stream is frame synchronized with the first received data sub-stream.

11. The digital system according to claim 10, wherein the synchronizing circuitry further comprises:
  frame check circuitry operable to test for frame synchronization by determining if the frame pulse of the received data sub-stream is synchronized with the frame pulse of the master receiver; and
  a byte pipe with a byte tap point operable to delay the received data sub-stream a first number of bytes in response to the frame check circuitry so that the received data sub-stream is frame synchronized with the received data sub-stream of the master receiver.

* * * * *